United States Patent [19]

Schuh et al.

BEST AVAILABLE COPY

[11] 3,955,240

[45] May 11, 1976

[54] MULTI-POSITION SAFETY LOCK JOINT, PARTICULARLY FOR FOLDING LADDERS

[75] Inventors: Karl Schuh, Pluderhausen; Hans Schniepp, Lorch, both of Germany

[73] Assignee: Firma Wilhelm Bahmuller, Maschinen- und Apparatebau, Pluderhausen, Germany

[22] Filed: July 10, 1975

[21] Appl. No.: 594,820

[30] Foreign Application Priority Data

Apr. 5, 1975 Germany .......................... 2514940

[52] U.S. Cl. ................................ 16/144; 182/163; 403/93

[51] Int. Cl.[2] .................. E05D 11/10; F16C 11/00; E06C 7/50

[58] Field of Search ..................... 182/163, 164, 24; 16/144; 403/93

[56] References Cited

UNITED STATES PATENTS

| | | | |
|---|---|---|---|
| 3,643,292 | 2/1972 | Mayer | 16/144 |
| 3,655,012 | 4/1972 | Hoffman | 182/163 |
| 3,879,146 | 4/1975 | Mayer | 16/144 |

FOREIGN PATENTS OR APPLICATIONS

| | | | |
|---|---|---|---|
| 2,052,584 | 5/1972 | Germany | 182/163 |

*Primary Examiner*—Reinaldo P. Machado
*Attorney, Agent, or Firm*—Flynn and Frishauf

[57] ABSTRACT

A freely rotatable disk formed with projections is held in a given position by a spring. The projections and the notches between the projections are selectively engageable by a handle element to deflect the disk, upon operation of the handle element, from its rest position and hold the handle element in an extended position permitting release of a locking bar effecting disengagement with a cooperating locking disk respectively secured to stringer or rail elements of a ladder, to permit the elements to pivot with respect to each other; the spring returning the disk upon movement of the handle to permit engagement of the locking bar, so that the disk, in one position, securely holds the handle and prevents spurious unlocking of the locking bar, and holds the handle in lock-release position to permit free pivoting of the ladder rail or stringer elements when in another position.

8 Claims, 5 Drawing Figures

MULTI-POSITION SAFETY LOCK JOINT, PARTICULARLY FOR FOLDING LADDERS

The present invention relates to multi-position safety lock joints, and more particularly to a joint of this type for use in folding ladders, or to connect other elongated elements in relatively adjusted selective fixed positions.

Various joints for elongated elements, and particularly for the rails or stringers of ladders have been proposed (see, for example, German Utility Patent DT-GBM 6,603,088), in which a manually operated release lever is provided to release a locking element secured to a joint, and, in another position, to permit the locking element to lock the joint in relatively adjusted position. The locking element is spring-loaded, and the release lever is effective to operate counter the spring loading. The locking element may be constructed in the form of a holding lever which can swing or pivot about a pivot axis parallel to the axis of the joint itself. The holding lever itself is controlled by a cam which is fixed to that portion of the joint which carries the locking bolt. This arrangement further provides that the release handle is located beyond the joint axis, but arranged together with the locking element and the cam controlling the locking element, in a position between bells or cups forming a locking disk, and part of the joint. Such a mechanism and joint is comparatively complicated. Due to location of the operating lever between the cups or bells, the bells or cups must be open to the outside, which permits penetration of dirt and other contamination which may interfere with proper operation. The maximum loading of the joint is limited due to the arrangement of parts, and the formation of the locking mechanism itself.

It is an object of the present invention to provide a multi-position safety lock joint which can lock a pair of pivoted elongated elements, such as the stringers or rails of a ladder in relatively adjusted positions, and more particularly to provide a multi-position joint for use in folding ladders which is simple to construct, reliable, and essentially immune against penetration of dirt, or other contamination, while providing improved safety and load handling capability.

Subject matter of the present invention: Briefly, the holding element of the joint is a toothed disk, or a disk formed with projections thereon (thus resulting in notches between the projections), which disk is rotatable on the pivot axis of the joint and held in a rest position by means of a spring. The disk cooperates with the manually operated release handle. The projections formed on the disk are so arranged thereon that they cooperate with the release handle in such a manner that the disk is reflected against the spring force upon operation of the handle tending to release the locking bolt from a counter locking element formed with matching openings or recesses, a projection of the disk locking the handle in released position (with respect to the locking bolt) due to the spring bias of the disk, and thus permit free pivoting movement of the ladder stringers or rails. Upon release of the handle, and swinging of the rails, the locking element will then engage in the next adjacent locking recess or opening, to lock the ladder stringers securely together, the disk returning to rest position under its spring force, so that the manually operated lever will remain in rest position as well.

The invention will be described by way of example with reference to the accompanying drawings, wherein.

Figure 5:
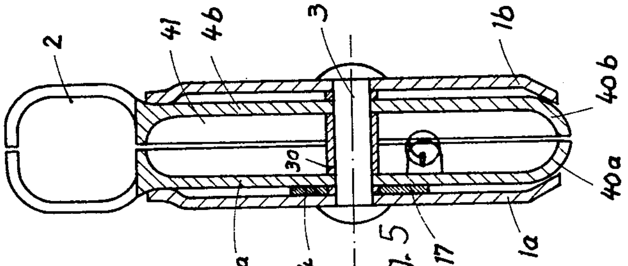
Figure 2:
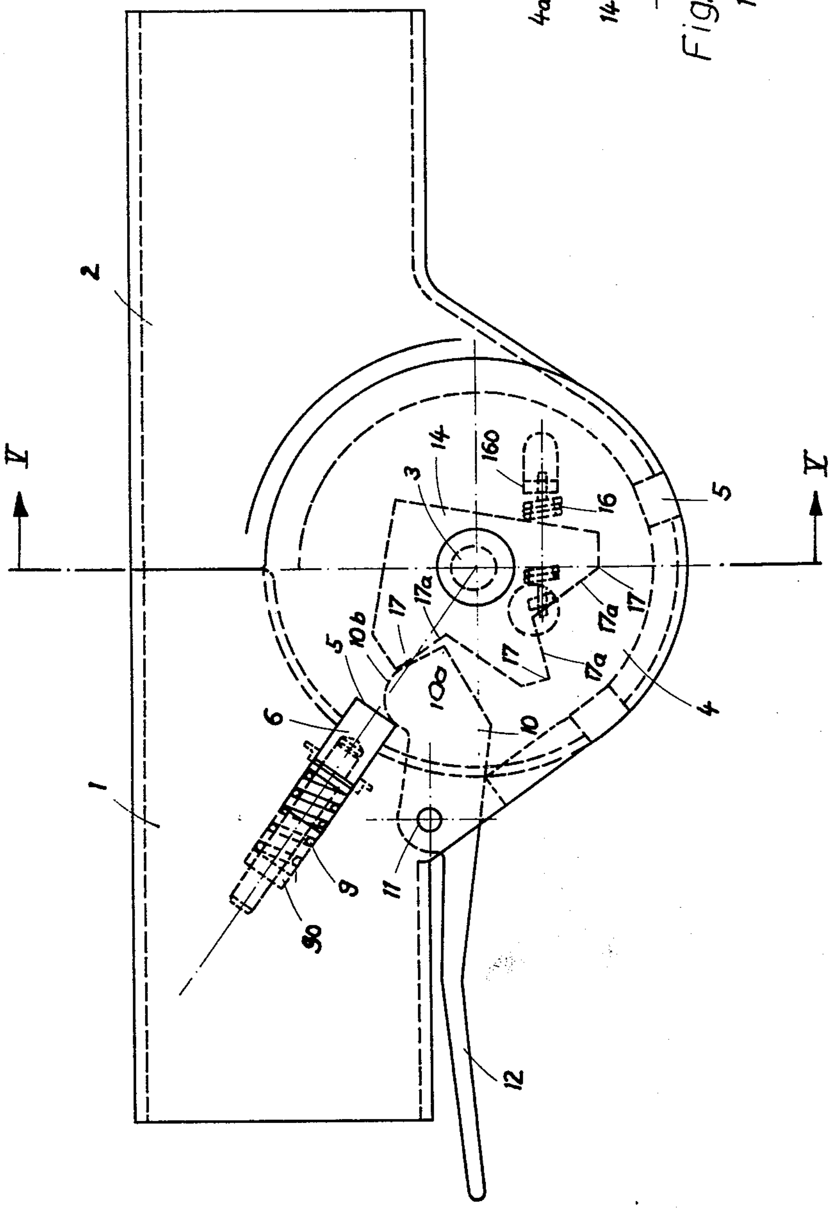
FIG. 2 is a view similar to FIG. 1, with the joint in a different position.

and FIG. 5 is a section along line V-V of FIG. 2.

The joint in accordance with the present invention finds principal use in the connection of the stringers or rails of multi-position ladders, or other elongated elements, which may be used, for example, as a straight ladder, as a folding ladder, or, when combined with other holding bars or elements, as scaffolding or the like. The joint itself has two joint portions 1, 2 which are connected to, or form part of the ladder rails. They can pivot about a pivot axis defined by a bolt or rivet 3. The first joint element 2 which may, for example, be formed as a two-portion channel (see FIG. 5) has a locking disk 4 secured thereto formed, as seen in FIG. 5, of a pair of shell or cup halves 4*a*, 4*b*. At least a portion of the cup halves 4*a*, 4*b* is circular. The cup halves have open notches 5 formed at the circumference thereon, distributed circumferentially about the circular extent of disk 4. The two cup or shell halves 4*a*, 4*b* of disk 4 are bent inwardly (FIG. 5) and merge into circumferential edge portions 40*a*, 40*b* which, together with the cup halves 4*a*, 4*b* define an inner chamber 41. The inwardly bent edge portions 40*a*, 40*b* additionally increase the stiffness and strength of the cup halves 4*a*, 4*b* of disk 4, and thus permit high loading being placed against the notches or openings 5 at the circumference thereof, so that the joint portion or element 2 can accept high loading thereof. The interior chamber 41 is additionally essentially closed, and entry of contamination is effectively prevented.

Figure 3:
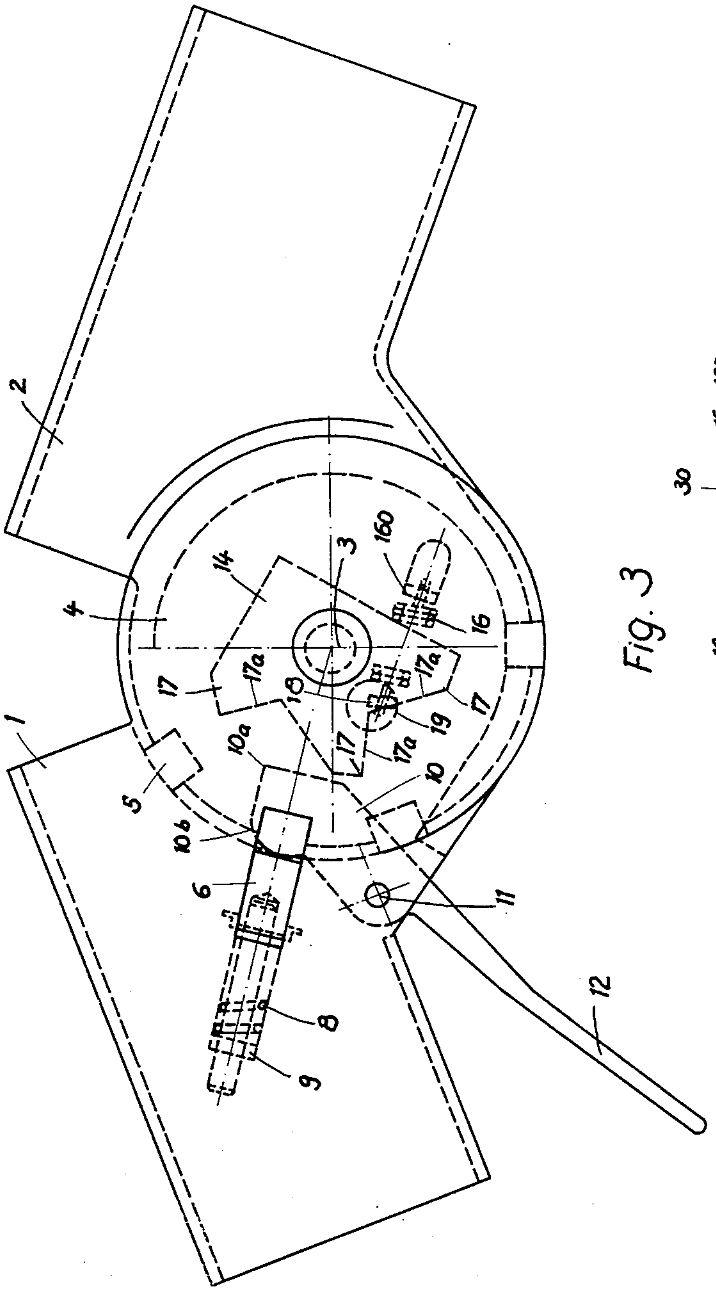
FIG. 3 is a view similar to FIG. 1, with the handle moved preparatory to changing the position of the joint from the illustration in FIGS. 1 or 3 to, for example, the position in FIG. 2.
Figure 4:
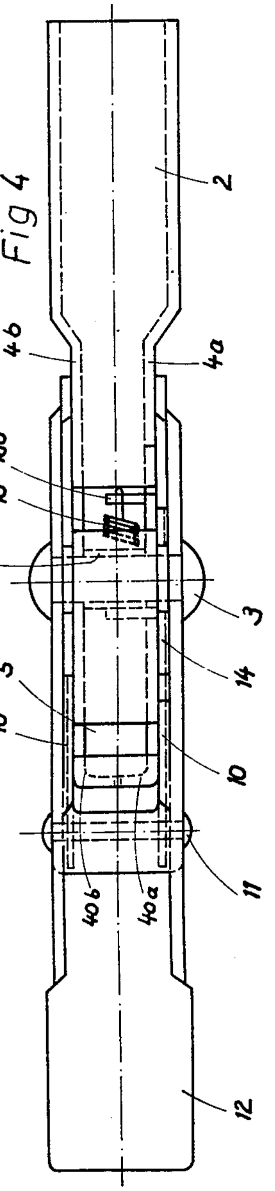
FIG. 4 is a bottom view of the joint of FIG. 2, partly cut away.

A locking element, such as a bolt 6 (FIG. 1), engages in a selected one of the openings or notches 5, as determined by the desired relative angular position of the elements 1, 2. The bolt 5 is longitudinally guided in the joint portion 1 and is spring-biased by a spring 8 which bears against a U-shaped cap element 9. Cap 9 has laterally extending projections which are guided in two elongated slits 90 formed in opposite sides of the element 1 which, in cross section, preferably is similar to the cross section of element 2 (FIG. 5). A manually operated release element 10, pivotally connected to element 1 and forming part of a handle 12, is engageable with the locking bolts 6 in order to release locking bolts 6 from engagement with a notch or opening 5. The handle 10, 12 is rotatable about the pivot point 11; the manually operated handle portion 12 extends beyond the region of the joint. The pivot point 11 is formed as a pivot bolt fixed to the joint element 1 and so arranged that it is located at the side of the operating lever 10, 12 which is closest to the locking bolt 6 — see FIGS. 1–3.

Figure 1:
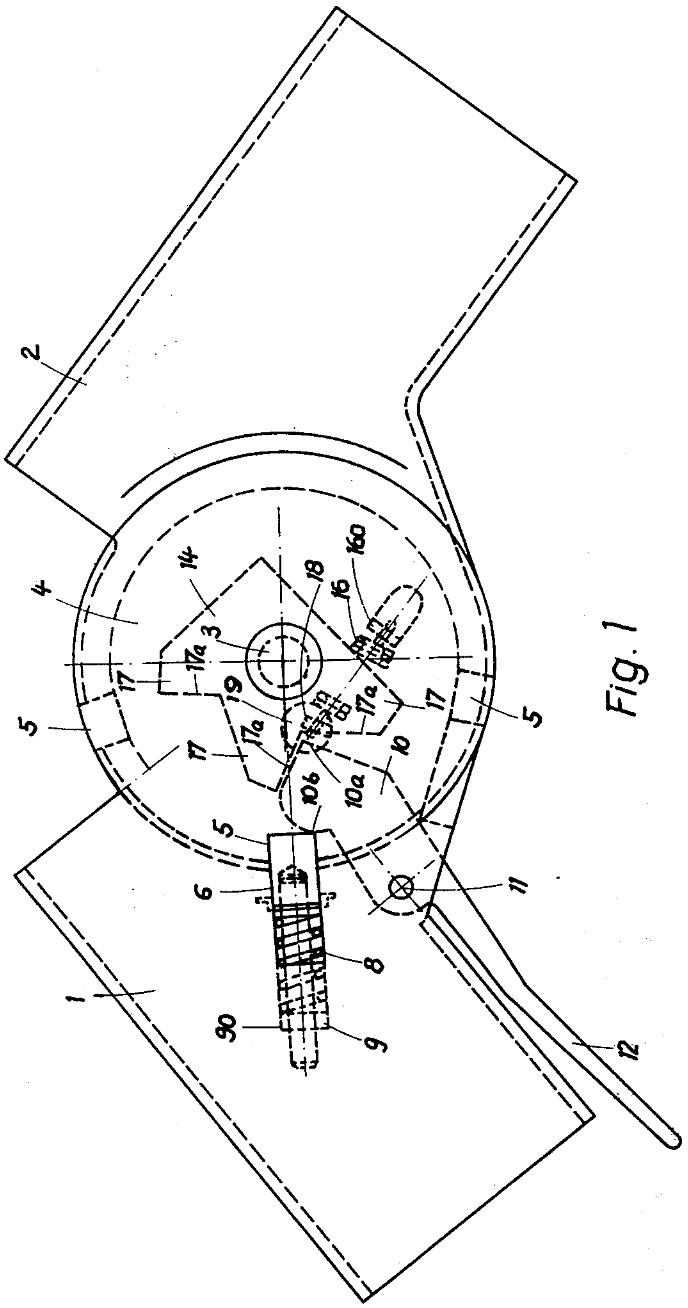
FIG. 1 is a schematic side view of a joint for a pair of ladder stringers, in which the joint is in a first position, and the locking lever is in a first position.

The position of the pivot point, and the shape of the manually operated release lever 10, 12 requires swinging the manually operable portion 12 away from the joint element 1 if the joint is to be released, that is, to release the locking bolt 6 from an associated notch or opening 5 formed in the edge portion of the disk 4. Comparison of FIGS. 1 and 3, or 2 and 3, respectively, clearly shows the operation of the lever 10, 12 and its engagement with bolt 6. When a locking bolt 6 is engaged in a notch 5, to lock the elements 1, 2 together, the manually operable portion 12 of the locking lever will lie, or fit against the element 1 (FIGS. 1, 2).

Bolt 3 is surrounded by a spacer sleeve 30 which secures the halves 4*a*, 4*b* of the disk 4 (FIG. 5) in their required position, so that when bolt 3 is riveted over, as shown in FIG. 5, the halves 4*a*, 4*b* will not collapse. The bolt or rivet 3 carries, additionally, a disk 14 which is located thereon to be freely rotatable with respect to the bolt 3, as well as with respect to the adjacent cup half 4*a*. Disk 14, on one side, fits against the outside of one of the halves 4*a*, 4*b*. Disk 14 may be formed as a dual disk, one on either side of the halves 4*a*, 4*b;* if not, a spacer washer of the same thickness as disk 14 is preferably located between the other half of the disk 4 and the inside of the respective joint element 1.

Disk 14 is formed with tooth-like projections 17 (FIGS. 1, 2, 3) so arranged that the projections are associated with a respective one of the notches 5 formed in the circumference of disk 4. Each one of the projections 17 is formed with a surface 17*a* which extends inwardly and outwardly with respect to the circumference of the disk, and which cooperates with a corner 10*a* of the handle 10, 12, as will appear below. Disk 14 additionally is formed with a lug 18 extending at right angles therefrom through a hole 19 formed in the half 4*a* of the locking disk 4, so that lug 18 extends into the chamber 41 between the halves 4*a*, 4*b*. A spring 16 is located in chamber 41, having one end hooked around lug 18 and the other hooked around a hook 160, extending inwardly from the disk half 4*a*, for example by being punched therefrom. Spring 16 biases the holding disk 14 into a position in which the lug 18 engages an edge of the hole 19, when the bolt 6 is in locked position, as appears in FIGS. 1 and 2.

The joint portion of element 1 is also formed in two halves, as cup or shell halves 1*a*, 1*b* (FIG. 5) which surround the shell halves 4*a*, 4*b* as well as disk 14 from the outside. Outer shell halves 1*a*, 1*b* thus cover the joint and the disk 14 towards the outside. The cover is additionally protected against the outside by bent-over end portions joined to the halves 1*a*, 1*b*, which fit against the in-turned ends 40*a*, 40*b* of the inner shell halves 4*a*, 4*b* (see FIG. 5). The handle 12 is shaped as a double-sided sheet metal element, bent to have approximately U-shaped cross section. The inner release portions 10 are located on both sides of the locking disk 4, one of the release portions cooperating with the disk 14. The handle 10 thus can readily be formed as a single punched and shaped sheet metal handle, forming a double-armed lever pivoted about pivot 11.

FIG. 1 illustrates the position in which the locking bolt 6 is engaged in a notch 5 of the locking disk 4. Upon swinging of the handle 12 about pivot 11 in counterclockwise direction, that is, away from the element 1, the portion 10 will engage the locking bolt 6 with a rounded camming surface 10*b* thereof to lift the bolt 6 out of the notch or aperture 5 in the disk 4. This compresses spring 8. Pivoting of the handle 11 additionally pivots the disk 14 by engagement of the corner 10*a* with the surface 17*a*, counter the action of the spring 16. The actual tilt angle is small. Spring 16 is stretched, however, and upon further movement of the lever 10, 12 about pivot 11, the handle 10, 12 will reach the position illustrated in FIG. 3, in which the corner 10*a* is free from the surface 17*a* of the disk 14. The spring 16, which has been stressed, can now return disk 14 into the position shown by rotating disk 14 in clockwise direction until the lug 18 engages the inner edge of the hole 19 (see FIG. 3). The handle 12 now can be released and yet the locking element 6 can no longer engage in an opening 5, or return in the opening 5 from which it has been lifted, since the handle portion 10 is prevented from falling back by the projection 17 engaging the back side of the portion 10. The two joint elements 1, 2 now can be pivoted with respect to each other without interference and freely. Upon pivoting, the handle portion 10 is released from the projection 17 which previously held it in position, thus releasing the locking bolt 6. The locking bolt 6 will engage the smooth circumferential portion of the edges 40*a*, 40*b* of disk 4 until it engages the next adjacent notch or aperture 5 upon continued rotation of the elements 1, 2 with respect to each other. Disk 14 is likewise returned into its initial position (see FIGS. 1 and 2) by the spring 16.

Locating the disk 14 coaxially with respect to the disk 4 results in simple relationships of the parts with respect to each other, requiring only little space. The chamber within which spring 16 is retained can readily be protected against contamination from the outside, and gaps between the shell halves, as well as between the outer shell halves 1*a*, 1*b* and the adjacent shell halves 4*a*, 4*b* can be easily closed, for example by a resilient, yet readily slidable bead, for example of plastic such as nylon. Forming the handle 10, 12 as a single punched and shaped sheet metal element facilitates manufacture, assembly, and location of the handle on the joint elements themselves.

We claim:

1. Multi-position safety lock joint, particularly for use with folding ladders, having a first, at least partly circular joint element (2) formed with peripheral notches (5), a second, at least partly circular joint element (1), a pivot member (3) passing through the center of said joint elements and connecting them together;

a resiliently biased locking element (6) located on the second joint element (1) and engageable with the notches (6) in the first joint element (2) to lock the two joint elements in relatively fixed position;

an operating handle (10, 12) pivoted (11) on the second joint element (1) having a manually operated portion (12) extending beyond the joint for manual operation thereof and an engagement portion (10) engageable with the locking element (6) to disengage the locking element from the notch (5);

and holding means (14) resiliently positioned and engageable with the handle (10, 12) in a first position to hold the handle in the position in which the locking element (6) is disengaged from a notch and, upon relative pivoting movement of the joint elements (1, 2), is released from the first engaged position with the handle to permit the locking element (6) to engage in a notch (5) and to lock the joint against relative rotation;

wherein the holding means (14) comprises a disk (14) rotatable on the pivot member (3);

a spring (16) is provided secured to the joint and holding said disk (14) in a position other than said first position, said disk being formed with projecting holding teeth (17) and located relative to the notches (5) on said first joint member (1) and the engagement portion (10) of the handle to be engaged by said engagement portion of the handle and rotate counter the force of said spring (16) upon movement of the handle to release the locking element (6) from a notch (5), the teeth (17) of said disk and the engagement portion (10) of said handle being shaped to release the disk (14) from engagement with the handle when the handle has moved in the locking member position so that a respective tooth will be moved in interfering position with the handle to block pivoting movement of the handle until a notch (5) of the first member is in position to receive the locking member (6) located on the second member (1).

2. Joint according to claim 1, wherein the second member (2) comprises a locking shell (4) formed with said notches (5), said shell being formed in two parts (4*a*, 4*b*) fitted against each other.

3. Joint according to claim 1, wherein the second member (2) comprises a locking shell (4) formed with said notches (5), said disk (14) being located adjacent the shell (4) and being formed with a projection (18) transversely thereof and extending through an opening (19) in the shell (4);

and the spring (16) is located in the shell (4) and secured thereto.

4. Joint according to claim 3, wherein the engagement portion (!0) of the handle comprises a doubled-over, shaped element, one branch of which element is located adjacent the side of the shell (4).

5. Joint according to claim 3, wherein the handle is a double-arm lever formed as a unitary element having a pivot point.

6. Joint according to claim 2, wherein the two parts (4*a*, 4*b*) of the shell have in-turned edge portions (40*a*, 40*b*) to define a chamber between the parts of the shell which is essentially closed to the outside.

7. Joint according to claim 6, wherein the second member (1), in the region of the joint, is formed as a double shell (1*a*, 1*b*), located adjacent the shell parts (4*a*, 4*b*) of the locking shell of the first member (2) and overlapping the outside of said two parts.

8. Joint according to claim 7, wherein the two shell halves (1*a*, 1*b*) of the second member (1) are formed with in-turned edge portions matching the end portions (40*a*, 40*b*) of the two parts of the locking shell (4).

* * * * *